(12) United States Patent
Yoshida et al.

(10) Patent No.: US 10,451,103 B2
(45) Date of Patent: Oct. 22, 2019

(54) CABLE CONNECTING MECHANISM

(71) Applicant: HI-LEX CORPORATION, Takarazuka (JP)

(72) Inventors: Sho Yoshida, Takarazuka (JP); Masaki Tamura, Takarazuka (JP); Tatsuhiko Hasegawa, Takarazuka (JP)

(73) Assignee: HI-LEX CORPORATION, Takarazuka-shi (JP)

( * ) Notice: Subject to any disclaimer, the term of this patent is extended or adjusted under 35 U.S.C. 154(b) by 0 days.

(21) Appl. No.: 16/077,164

(22) PCT Filed: Jan. 31, 2017

(86) PCT No.: PCT/JP2017/003450
§ 371 (c)(1),
(2) Date: Aug. 10, 2018

(87) PCT Pub. No.: WO2017/141695
PCT Pub. Date: Aug. 24, 2017

(65) Prior Publication Data
US 2019/0024700 A1 Jan. 24, 2019

(30) Foreign Application Priority Data
Feb. 19, 2016 (JP) ................. 2016-029436

(51) Int. Cl.
*F16C 1/10* (2006.01)
*F16C 1/14* (2006.01)
*F16C 1/16* (2006.01)

(52) U.S. Cl.
CPC ............... *F16C 1/101* (2013.01); *F16C 1/14* (2013.01); *F16C 1/16* (2013.01); *F16C 2326/08* (2013.01)

(58) Field of Classification Search
CPC .... F16C 1/101; F16C 1/14; F16C 1/16; F16C 2326/08; F16C 1/10; F16C 1/106; F16C 1/12; F16C 1/145
See application file for complete search history.

(56) References Cited

U.S. PATENT DOCUMENTS 10,234,060 B1 * 3/2019 Ficyk ..................... F16L 3/18
2009/0175676 A1   7/2009 Ficyk
(Continued)

FOREIGN PATENT DOCUMENTS

| JP | S63-028912 U | 2/1988 |
| JP | H11-141530 A | 5/1999 |

(Continued)

OTHER PUBLICATIONS

International Search Report for International Application No. PCT/JP2017/003450 dated Apr. 25, 2017 (2 Sheets).

*Primary Examiner* — Patrick Cicchino
(74) *Attorney, Agent, or Firm* — Kratz, Quintos & Hanson, LLP

(57) ABSTRACT

Provided is a cable connecting mechanism including a slider and a slider housing member. The slider housing member has a lid member, a bottom surface member, a pair of side walls, a one-end-side hinge connecting the lid member and the bottom surface member, an another-end-side hinge connecting the member and the bottom surface member, a first engagement structure provided on an outer surface closer to one end of the slider housing member than the one-end-side hinge, a second engagement structure, a third engagement structure, a fourth engagement structure, a cable extension part, and a wall portion arranged to be sandwiched between the one-end-side hinge and the another-end-side hinge. In a closed state, when a load is applied to the cable so as to release the closed state by pressing at least one of the lid member and the bottom surface member, the wall portion (Continued)

abuts against an outer circumference of another one of the lid member and the bottom surface member, to restrict a movement of the lid member or the bottom surface member in an alignment direction of the pair of side walls. Therefore, the hinge is not easily broken.

5 Claims, 4 Drawing Sheets

(56) References Cited

U.S. PATENT DOCUMENTS

2017/0254354 A1* 9/2017 Carabalona ............ E05B 53/005
2018/0119723 A1* 5/2018 Naoi ....................... F16C 1/101

FOREIGN PATENT DOCUMENTS

| JP | 2001-208036 A | 8/2001 |
| JP | 2015-145685 A | 8/2015 |
| WO | 2015/115639 A1 | 8/2015 |

* cited by examiner

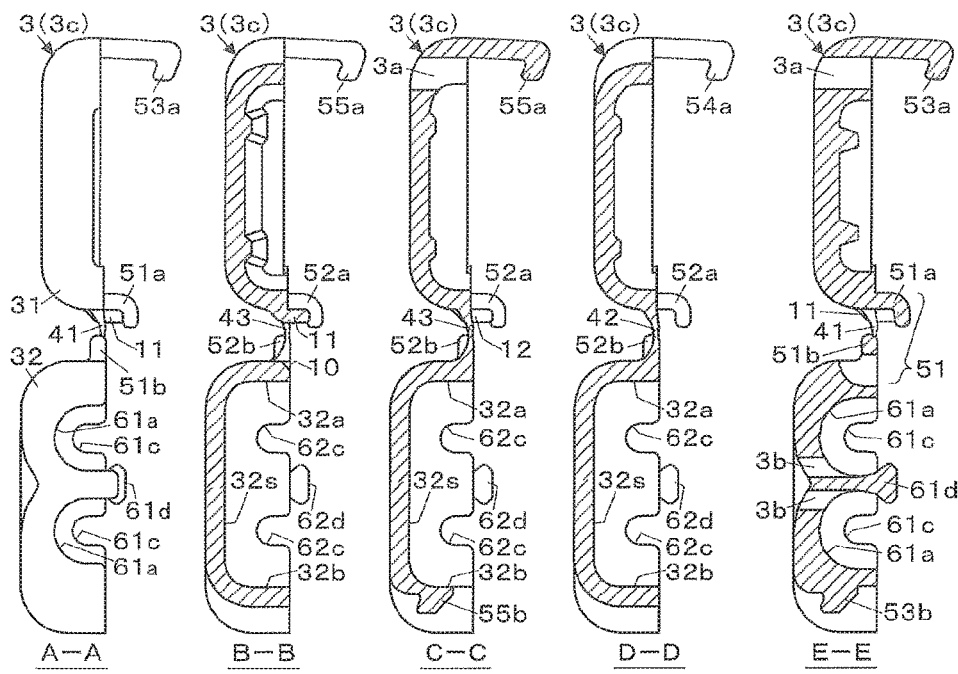
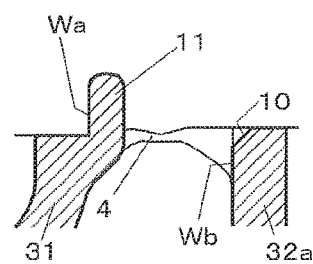
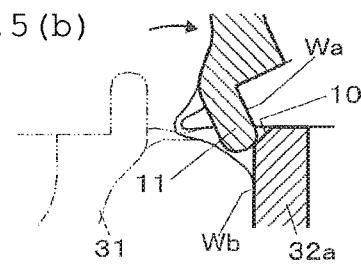
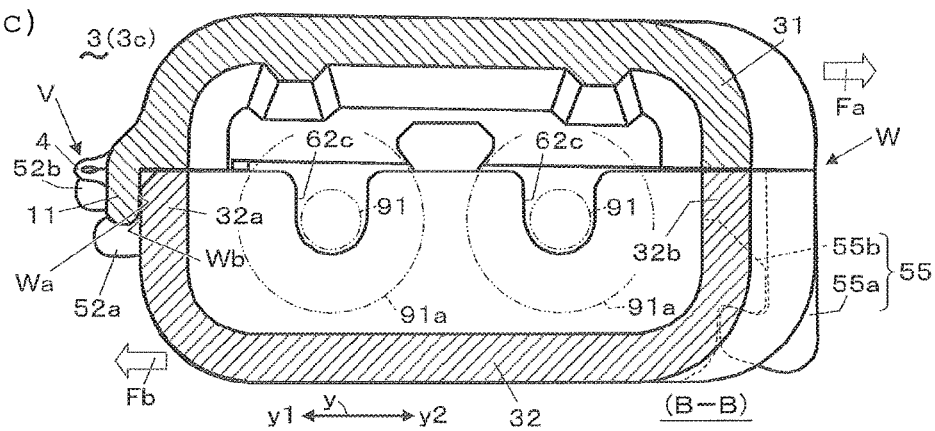

CABLE CONNECTING MECHANISM

TECHNICAL FIELD

The present invention relates to a cable connecting mechanism.

BACKGROUND ART

There is known a cable connecting mechanism that connects a plurality of cables and transmits an operating force by an operating member to a working member via these cables.

For example, a cable connecting mechanism described in Patent Literature 1 includes a plurality of cables, a joint piece having a locking part to which cable ends of a plurality of cables are locked, and a case having a housing space that slidably houses the joint piece. The case has a lid member and a bottom surface member. The lid member and the bottom surface member are connected with each other by a hinge and configured to enable opening and closing about the hinge with respect to the bottom surface member. In addition, an engaging claw formed on the lid member engages with an engaged part that is formed on the bottom surface member, thereby maintaining a closed state of the case.

CITATION LIST

Patent Literature

Patent Literature 1: JP 2015-145685 A

SUMMARY OF INVENTION

Technical Problem

Depending on a routing direction of the cables which are led out from the case, the cables give some forces to the lid member and the bottom surface member, so that the lid member and the bottom surface member tend to move relative to each other, causing a risk of breaking the hinge. Therefore, in such a cable connecting mechanism, it is desirable to route the cables so as not to transmit force from the cables to the lid member or the bottom surface member via the joint piece.

Accordingly, an object of the present invention is to provide a cable connecting mechanism in which a hinge is not easily broken.

Solution to Problem

A cable connecting mechanism of the present invention includes a slider and a slider housing member that houses the slider and has a space allowing the slider to slide. In this cable connecting mechanism, the slider has a cable connecting part connected with a cable at both end parts in a sliding direction of the slider. The slider housing member includes a lid member, a bottom surface member provided with a sliding surface on which the slider slides, a pair of side walls rising from the sliding surface and extending along the sliding direction of the slider, a one-end-side hinge provided on an outer surface on one end side of one of the pair of side walls and connecting the lid member and the bottom surface member, an another-end-side hinge provided on an outer surface on another end side of one of the pair of side walls and connecting the lid member and the bottom surface member, a first engagement structure that is provided on an outer surface closer to one end of the slider housing member than the one-end-side hinge and maintains the slider housing member in a closed state, a second engagement structure that is provided on an outer surface closer to another end of the slider housing member than the another-end-side hinge and maintains the slider housing member in a closed state, a third engagement structure that is provided on an outer surface on one end side of another one of the pair of side walls and maintains the slider housing member in a closed state, a fourth engagement structure that is provided on an outer surface on another end side of another one of the pair of side walls and maintains the slider housing member in a closed state a cable extension part provided at both end parts and allowing the cable to extend to the outside, and a wall portion arranged on an outer surface of the slider housing member to be sandwiched between the one-end-side hinge and the another-end-side hinge. In the closed state, when a load is applied to the cable so as to release the closed state by pressing at least one of the lid member and the bottom surface member, the wall portion abuts on an outer circumference of another one of the lid member and the bottom surface member, and thus restricts a movement of the lid member or the bottom surface member in an alignment direction of the pair of side walls.

Advantageous Effects of Invention

According to the cable connecting mechanism of the present invention, the hinge is not easily broken.

BRIEF DESCRIPTION OF DRAWINGS

FIG. 4(a) is a view as seen from a direction of arrow A of a slider housing member of the cable connecting mechanism of FIG. 2, FIG. 4(b) is a cross-sectional view taken along line B-B of FIG. 2, FIG. 4(c) is a cross-sectional view taken along line C-C of FIG. 2, FIG. 4(d) is a cross-sectional view taken along line D-D of FIG. 2, and FIG. 4(e) is a cross-sectional view taken along line E-E of FIG. 2.

FIG. 5(a) is a detailed cross-sectional view of a hinge portion in FIG. 4(b), FIG. 5(b) is a cross-sectional view in a halfway stage of closing the slider housing member from the state of FIG. 5(a), and FIG. 5(c) is a cross-sectional view of the slider housing member of FIG. 4 (b) in a closed state.

DESCRIPTION OF EMBODIMENTS

Figure 1A:
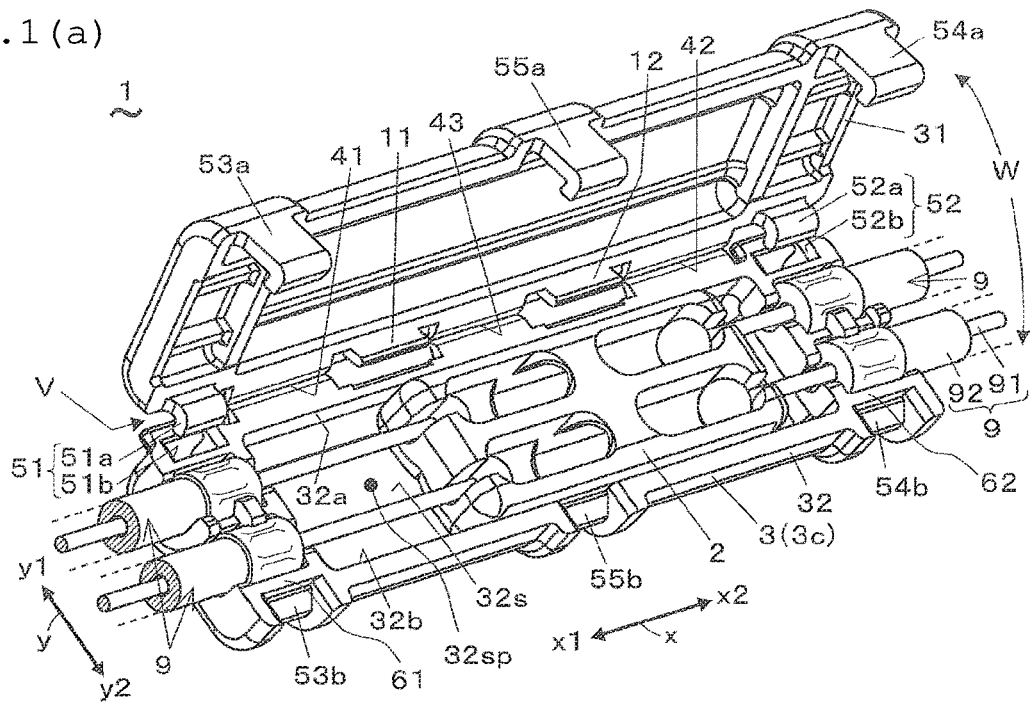
FIG. 1(a) is a perspective view of a state where a slider housing member of a cable connecting mechanism according to an embodiment is opened.
Figure 1B:
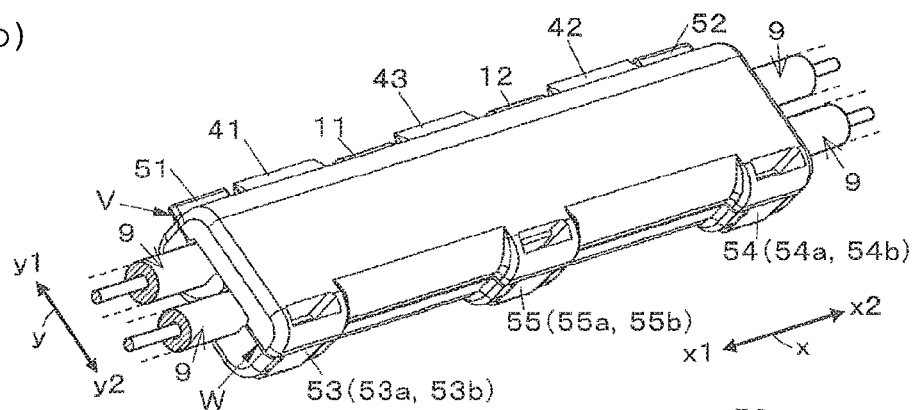
FIG. 1(b) is a perspective view of a state where the slider housing member of FIG. 1(a) is closed.
Figure 1C:
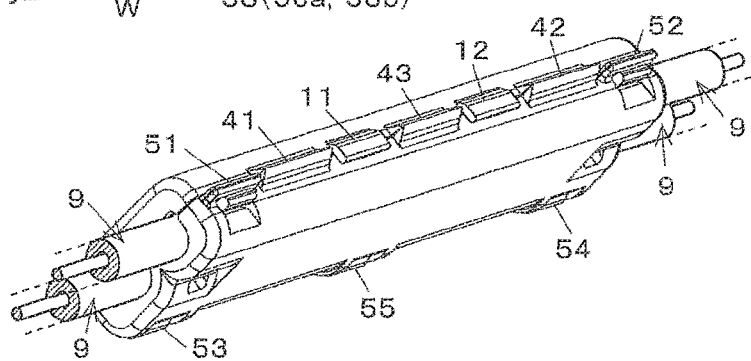
FIG. 1(c) is a perspective view as seen from a direction different from FIG. 1(b).
Figure 3:
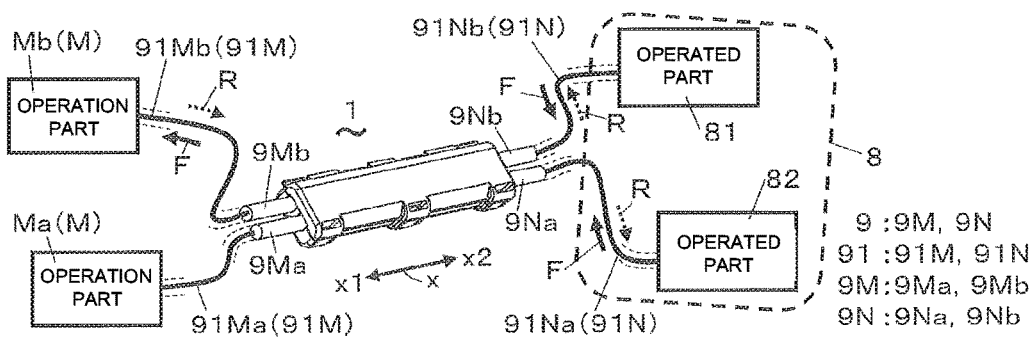
FIG. 3 is a schematic view illustrating a usage example of a cable connecting mechanism according to an embodiment.

A cable connecting mechanism according to an embodiment of the present invention will be described with reference to the drawings. As shown in FIGS. 1 and 3, and the like, a cable connecting mechanism 1 of the present embodiment is a mechanism that transmits an operating force applied to an operation-side cable 9M connected to an operation part M, to an operated-side cable 9N connected to operated parts 81 and 82 of an operated object 8. The cable operation mechanism 1 is a mechanism in which an operated part N is operated via a cable 9 by operating the operation part M. In the cable operation mechanism 1, the cable 9N on the operation part M side is connected to the cable 9M on the operated part side, and thereby a force which is input to the operation part M is transmitted to the operated part M. Configuring such that the cable 9N on the operation part M side is connected to the cable 9M on the operated part side allows an operation system to be completed by connecting the cables to each other after separately assembling the operation part N side and the operated part M side. The cable operation mechanism 1 includes a slider 2 which is connected with the cable 9N on the operation part M side and the cable 9M on the operated part side, and a slider housing member 3 having a sliding space that slidably houses the slider 2.

Figure 2:
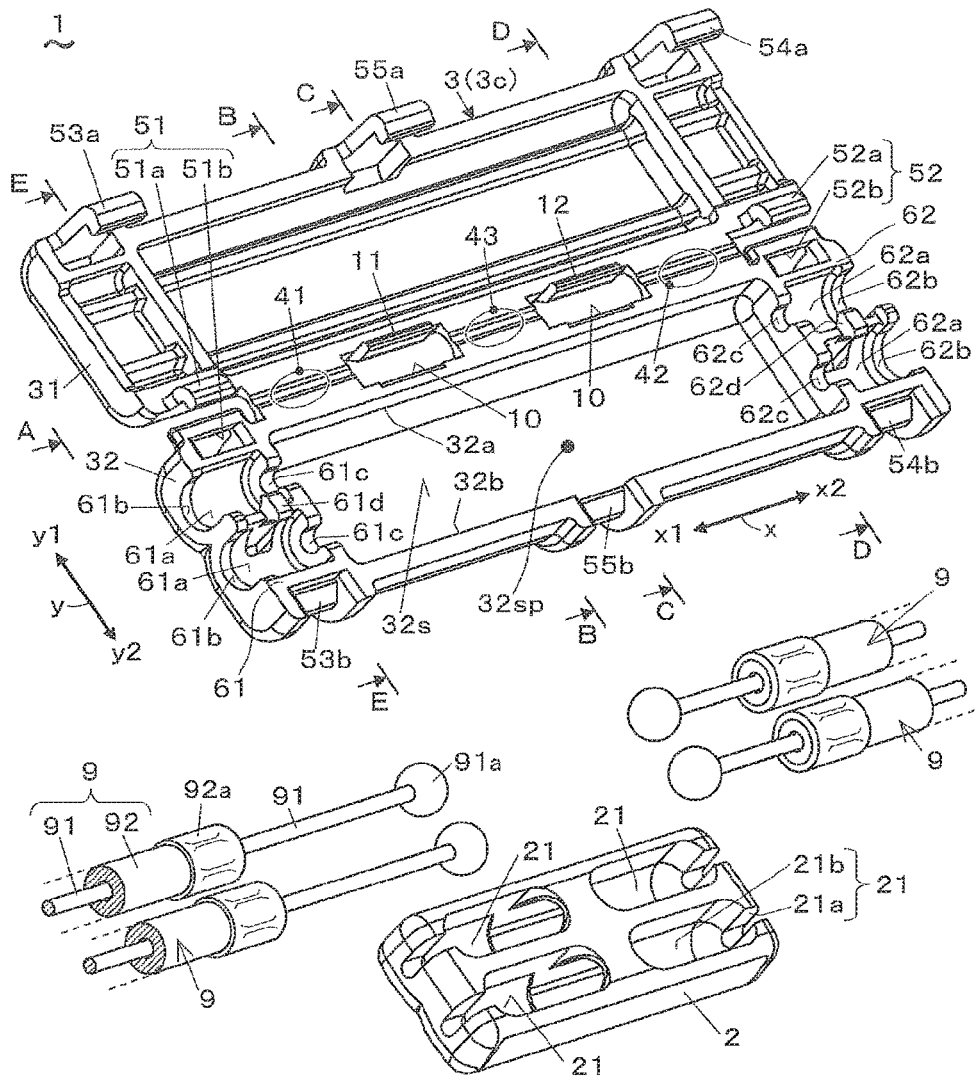
FIG. 2 is an exploded perspective view of a cable connecting mechanism according to an embodiment.

As shown in FIGS. 1 and 2, the slider 2 is a member which connects the cables 9M and 9N by being connected with the cables 9M and 9N at one end side and another end side, respectively, and is housed in a space (hereinafter referred to as a sliding space 3sp) provided inside the slider housing member 3. The slider 2 can slide in the sliding space 3sp inside the slider housing member 3. The slider 2 has a cable connecting part 21 connected with the cable 9 at both end parts in a sliding direction of the slider 2 (details will be described later).

The cable 9 is a member to transmit an operating force applied to the operation part M to the operated part N. Here, the cable 9 has an inner cable 91 and an outer casing 92 through which the inner cable 91 it slidably inserted. One end of the inner cable 91 is connected to the slider 2, and another end of the inner cable 91 is connected to the operation part M or the operated part N. One end of the outer casing 92 is fixed to the slider housing member 3, and another end side of the outer casing 92 is typically fixed to the operation part M or the operated part N, or in the vicinity of these and the like. It should be noted that the cable 9 does not necessarily have the outer casing 92 on one end part and another end part of the slider 2. Further, it is sufficient that at least one cable 9 is connected to each end, and the number of cables 9 connected to one end part and another end part of the slider 2 is not particularly limited. Further, a combination of the numbers of cables on the operation side and the cables on the operated side is not particularly limited. In the present embodiment, two cables 9 are connected to each of the both end parts of the slider 2 (details will be described later).

The slider housing member 3 is a member having the sliding space 3sp, which is a space allowing the slider 2 to slide. When the slider 2 slides in the sliding space 3sp of the slider housing member 3, the slider 2 can move stably without interference of peripheral members. The slider housing member 3 includes a lid member 31, a bottom surface member 32 provided with a sliding surface 32s on which the slider 2 slides, and a pair of side walls 32a and 32b rising from the sliding surface 32s and extending along the sliding direction of the slider 2. It should be noted that the side walls 32a and 32b are not required to be integrally formed with the bottom surface member 32, as long as the side walls 32a and 32b are configured to rise and extend from the sliding surface 32s. For example, the side walls 32a and 32b and the bottom surface member 32 may be separate members such as an aspect in which the lid member 31 and the side walls 32a and 32b are integrally formed and the sliding surface 32s is configured to be in contact with the side walls 32a and 32b, or an aspect in which each of them is configured as a separate member and integrally formed by adhesion or the like. The slider housing member 3 is configured such that the lid member 31 and the bottom surface member 32 are connected with each other by a hinge 4 (described later), and the lid member 31 can be opened and closed about the hinge 4 with respect to the bottom surface member 32. Further, each of the side walls 32a and 32b has an inner surface and an outer surface, and each inner surface faces the slider 2. In the present embodiment, one side wall 32a and the other side wall 32b are provided to be opposed to each other. In the present embodiment, the slider housing member 3 is a case member 3c in which the bottom surface member 32 and the pair of side walls 32a and 32b are integrally formed. The sliding space of the slider 2 is formed mainly by an inside surface of the lid member 31, the sliding surface 32s of the lid member 31, and the inner surfaces of the side walls 32a and 32b, of the case member 3c. The lid member 31 and the bottom surface member 32 can be opened and closed relative to each other by being connected by the hinge 4, and a shape of the slider housing member 3 is a substantially rectangular parallelepiped shape in a closed state. The slider housing member 3 is formed of, for example, resin.

Here, for convenience of description, directions x and y shown in the figure will be described. The direction x is the sliding direction of the slider 2. An x1 side and an x2 side in the direction x that are illustrated are defined as one end side and another end side, respectively. Further, in the direction x, a portion closer to the x1 or the x2 than a certain portion on one end side or a certain portion on another end side is referred to as an outer side, and an opposite side is referred to as an inner side. A direction y orthogonal to the direction x is a direction which the side walls 32a and 32b are aligned. A y1 side and a y2 side in the direction y that are illustrated are defined as one side and another side, respectively. Further, in the drawing, an upward direction perpendicular to the sliding surface 32s referred to as upward, and an opposite side is referred to as downward. This vertical direction is a relative direction with reference to the sliding surface 32s and does not define a mounting direction of the cable connecting mechanism 1.

As the hinge 4 connecting the lid member 31 and the bottom surface member 32, the slider housing member 3 has a one-end-side hinge 41, an another-end-side hinge 42, and a center hinge 43. The hinge 4 is a member that enables the slider housing member 3 to be opened and closed by rotation about the hinge 4 with respect to the bottom surface member 32 in a state where the lid member 31 and the bottom surface member 32 are connected. Further, the hinge 4 can prevent the lid member 31 and the bottom surface member 32 from separating in an opened state of the slider housing member 3, and suppress separation of the lid member 31 and the bottom surface member 32 from each other upon receiving a force, in an opening direction of the slider housing member 3, which is applied to the lid member 31 or the bottom surface member 32 from the cable 9 in a closed state of the slider housing member 3. In the present embodiment, one end of the hinge 4 is connected to the bottom surface member 32 via a portion including an outer surface of one of the side walls 32a and 32b, that is, the side wall 32a on the y1 side of the housing member 3, and another end is provided to connect, to an outer surface of the lid member 31. That is, the hinge 4 is connected to the lid member 31 via the side wall 32a. Here, a shaft side V and an opening and closing side W will be defined in the slider housing member 3. The shaft side V is a shaft side of a pivotal motion of the lid member 31 for opening and closing of the slider housing member 3, that is, a side provided with the hinge 4. The opening and closing side W is on an outer side of the pivotal motion of the lid member 31 for opening and closing, or a side opposite to the shaft side V (a side provided with the hinge 4) in the y direction. The one-end-side hinge 41 is provided on an outer surface on one end side (x1 side) of the side wall 32a that is one of the pair of side walls. The another-end-side hinge 42 is provided on an outer surface on another end side (x2 side) of the side wall 32a that is one of the pair of side walls. The center hinge 43 is provided at the center (the center in the x direction) of the side wall 32a that one of the pair of side walls. Both of the hinges 41 and 42 connect the lid member 31 and the bottom surface member 32 via the side wall 32a. In the present embodiment, as described above, the hinge 4 is integrally formed together with other members constituting the slider housing member 3. However, for example, in a case where the lid member 31 and the case member 3c are formed as separate members, a publicly known hinge may be adopted to connect both.

The slider housing member 3 has five engagement structures that maintain the slider housing member 3 in a closed state, that is, a first engagement structure 51, a second engagement structure 52, a third engagement structure 53, a fourth engagement structure 54, and a fifth engagement structure 55 (collectively referred to as an engagement structure 5). Here, the closed state refers a state where a closed space allowing the slider to stably slide is formed in the slider housing member 3. More specifically, it is a state where an opening of the case member 3c is closed by the lid member 31. Using the cable connecting mechanism 1 in the closed state of the slider housing member 3 allows the slider 2 to be protected and the slidability to be easily maintained.

The first engagement structure 51 and the second engagement structure 52 are provided on an outer surface of the shaft side V of the slider housing member 3. Therefore, in the closed state of the slider housing member 3, the first engagement structure 51, and the second engagement structure 52 mainly reduce a force applied to the hinge 4 and maintain a closed state of the side which is provided with the hinge 4 of the slider housing member 3. The first engagement structure 51 is provided on the outer surface closer to one end (closer to the x1) of the slider housing member 3 than the one-end-side hinge 41. The second engagement structure 52 is provided on the outer surface closer to another end (closer to the x2) of the slider housing member than the another-end-side hinge 42. It should be noted that the slider housing member 3 may further include an engagement structure on the shaft side V.

The first engagement structure 51 in the present embodiment has an engaging claw 51a which is provided on the lid member 31, and an engaging frame 51b which is provided on the bottom surface member 32. The engaging frame 51b has an engaging hole into which the engaging claw 51a is inserted. The engaging claw 51a is engaged with the engaging frame 51b by inserting a leading end part of the engaging claw into the engaging hole of the engaging frame 51b. The leading end part of the engaging claw 51a is inserted into the engaging hole by an opening and closing operation of the lid member 31 about the hinge 4. This restricts a relative movement of the lid member 31 and the bottom surface member 32, and thus the slider housing member 3 is maintained in the closed state. Similarly, the second engagement structure 52 includes an engaging claw 52a which is provided on the lid member 31, and an engaging frame 52b which is provided on the bottom surface member 32.

The third engagement structure 53, the fourth engagement structure 54, and the fifth engagement structure 55 are provided on an outer surface of another one of the pair of side walls 32a and 32b (here, the side wall 32b), and maintain the slider housing member 3 in a closed state. Here, "the engagement structures 53 to 55 is each provided on the outer surface of the side wall 32b" means that the engagement structures 53 to 55 are provided on the side wall 32b side of the outer surface of the slider housing member 3. Therefore, the engagement structures 53 to 55 each are provided not only on the side wall 32b. For example, an aspect that the engagement structures 53 to 55 each have an engagement part provided on one of the lid member 31 and the bottom surface member 32, and an engaged part provided on the other. In the present embodiment, the third engagement structure 53, the fourth engagement structure 54, and the fifth engagement structure 55 are provided on one end side, on another end side, and between one end side and another end side, on the outer surface of the side wall 32b and the corresponding outer surface of the lid member 31. In the present embodiment, each of the engagement structures 53 to 55 is an engagement structure of a so-called snap-fit structure. For example, the third engagement structure 53 is a structure which a leading end of an engagement part 53a that is formed as an engaging claw on the lid member 31 is engaged with an engaged part 53b that is a protrusion provided on the bottom surface member 32. This causes the housing member 3 to be maintained in a closed state. Similarly, the fourth engagement structure 54 and the fifth engagement structure 55 also have engagement parts 54a and 55a and engaged parts 54b and 55b. It is sufficient that the cable connecting mechanism 1 of the present embodiment has at least the third engagement structure 53 and the fourth engagement structure 54. The third engagement structure 53 is provided on the outer surface of one end side (x1 side) of the another one of the pair of side walls 32a and 32b (side wall 32b), and maintains the slider housing member 3 in a closed state. The fourth structure 54 is provided on the outer surface of another end side (x2 side) of the another one of the pair of side walls 32a and 32b (32b), and maintains the slider housing member 3 in a closed state. In addition, an engagement structure 5 on the opening and closing side W is not limited to the configuration in which the engagement parts 53a and the like are provided on the lid member 31 and the engaged part 54b and the like are provided on the bottom surface member 32, they may be provided at opposite positions. The structure of the engagement part 53a, the engaged part 53b, and the like is not limited to the snap-fit structure, but can be any engagement structure.

The slider housing member 3 includes cable extension parts 61, 62 and wall portions 11, 12. The cable extension parts 61, 62 are provided at both end parts of the slider housing member 3 and able to extend the cable 9 to the outside. The wall portions 11, 12 are arranged on the outer surface of the slider housing member 3 to be sandwiched between the one-end-side hinge 41 and the another-end-side hinge 42. The cable extension parts 61 and 62 guide an extending direction of the cable 9 which is led out from the cable connecting mechanism 1. As will be described later, the cable 9 presses at least one of the lid member 31 and the bottom surface member 32 in the closed state of the slider housing member 3, and thus a load is applied to at least one of the lid member 31 and the bottom surface member 32 so as to release the closed state of the slider housing member 3. At that time, the wall portions 11 and 12 abut on another outer circumference of the lid member 31 and the bottom surface member 32, and thus restrict a movement of the lid member 31 or the bottom surface member 32 in the alignment direction of the pair of side walls 32a and 32b. This prevents breakage of the hinge 4. The wall portion 11 is arranged to be sandwiched between the one-end-side hinge 41 and the center hinge 43 on the outer surface at the shaft side V of the slider housing member 3. The wall portion 12 is arranged to be sandwiched between the center hinge 43 and the another-end-side hinge 42. That is, it can be said that both of the wall portions 11 and 12 are arranged to be sandwiched between the one-end-side hinge 41 and the another-end-side hinge 42. In the present embodiment, the wall portions 11 and 12 are substantially plate-shaped portions which are provided on the lid member 31 side, to be opposed to the outer surface of the side wall 32a. In the closed state of the slider housing member 3, the wall portions 11 and 12 each abut on the outer surface of the side wall 32a, or are opposed to the side wall 32a in a state of having a slight gap between with the side wall 32a. In a portion of corner portions formed by the side wall 32a on the lid member 31 side and an outer surface of the wall portion 11, which is opposed to the wall portions 11 and 12, there is formed a chamfered portion 10 which the corner portion is chamfered. The side wall 32 having the chamfered portion 10 allows easier movement of the wall portions 11 and 12 to the outer surface of the side wall 32a when the lid member 31 is rotated about the hinge 4 to bring the slider housing member 3 into a closed state. This is because, as shown in FIG. 5, the wall portions 11 and 12 are not easily caught by the upper end of the side wall 32a.

As shown in FIGS. 1 and 2, in the present embodiment, the slider 2 has the cable connecting part 21 which one end of the inner cable 91 is locked at both ends in the sliding direction of the slider 2. Further, one end of the inner cable 91 has a cable end 91a. The cable end 91a has a diameter larger than a diameter of the inner cable 91. Locking the cable end 91a to the cable connecting part 21 causes the cable 9 to be connected to the slider 2. One end of the outer casing 92 has a terminal cap 92a to fix the outer casing 92 to the slider housing member 3. The terminal cap 92a is fixed to the outer casing 92. The terminal cap 92a has an outer diameter larger than an outer diameter of the outer casing 92. Typically, the terminal cap 92a is fitted to an end part of the outer casing 92, and is swaging-processed from an outer peripheral side and thus the terminal cap 92a is fixed to the end part of the outer casing 92.

In the present embodiment, the slider 2 has four cable connecting parts 21. More specifically, at each of the end parts of the slider 2, two cable connecting parts 21 are provided in parallel with each other in a direction (y direction) orthogonal to each of the sliding direction (x direction) of the slider 2 and the sliding surface 32s. Each cable connecting part 21 has a locking recess 21b and a cable lead-out groove 21a to lead out the inner cable 91 extending from the cable end 91a. The cable lead-out groove 21a opens to an upper surface side of the slider 2 (the direction orthogonal to both the sliding direction of the slider 2 and the sliding surface 32S) and to an end surface in the sliding direction. The groove width of the cable lead-out groove 21a (a length in the y direction, hereinafter the same for width) is wider than the diameter of the inner cable 91 and narrower than the diameter of the cable end 91a. The locking recess 21b is a recess which communicates with the cable insertion groove 21a and opens upward. The width of the opening of the locking recess 21b has a size that the cable end 91a cart be inserted and arranged from upward. The cable lead-out groove 21a and the locking recess 21b communicate with each other in the sliding direction (a direction) of the slider 2. Consequently, a step is generated at a portion where the cable lead-out groove 21a and the locking recess 21b communicate with each other, due to the difference in width between them. By the cable end 91a engaging with this step, the inner cable 91 is engaged with the slider 2, so that the cable 9 and the slider 2 are connected. The cable lead-out groove 21a and the locking recess 21b have a depth such that the cable end 91a does not protrude from the upper surface of the slider 2. As a material of the slider 2, for example, a hard resin or the like can be used.

Both end parts of the slider housing member 3 have the cable extension parts 61 and 62 capable of leading the cable 9 in the sliding space asp to outside. Further, in the present embodiment, the cable extension parts 61 and 62 have a structure that fixes the end of the outer casing 92 to the slider housing member 3. Specifically, the cable extension part 61 of one end side has two outer casing fixing parts 61a of one end side (hereinafter referred to as fixing parts 61a), to which the terminal cap 92a provided at one end of the outer casing 92 is fixed. The two fixing parts 61a are provided in parallel with each other in a direction (y direction) orthogonal to each of the sliding direction (x direction) of the slider 2 and the sliding surface 32s. Further, the first engagement structure 51, the two fixing parts 61a and 61a, and the third engagement structure 53 are arranged from the y1 side toward the y2 side.

The fixing part 61a is a portion to be disposed with one end of the outer casing 92, and is a semi-cylindrical recess which is disposed with the terminal cap 92a in the present embodiment. Further, the fixing part 61a has a bottom portion having an arc shape in cross section along the y direction, and a one-end-side wall portion and an another-end-side wall portion extending in the y direction. In the one-end-side wall portion, there is provided a semicircular notch 61b that communicates with the outside of the slider housing member 3 and allows the outer casing 92 to be led out. In the another-end-side wall portion, there is provided an insertion groove 61c having a circular bottom portion. Through the insertion groove 61c, the inner cable 91 is inserted. Each bottom part of the fixing part 61a, the notch 61b, and the insertion groove 61c are formed in cylindrical shapes that are coaxial with each other such that the outer casing 92, the terminal cap 92a, and the inner cable 91 can easily be fit.

When the terminal cap 92a is disposed in the fixing part 61a, the outer casing 92 is locked to the fixing part 61a by the step formed by the outer diameter difference between the outer casing 92 and the terminal cap 92a. Further, between the two fixing parts 61a and 61a, there is provided a flexible detachment preventing rib 61d that temporarily fixes the terminal cap 92a. The detachment preventing rib 61d has an overhanging portion that overhangs above the fixing part 61a. The terminal cap 92a is inserted into the fixing part 61a while bending the detachment preventing rib 61d, and temporarily fixed to the slider housing member 3 by the detachment preventing rib 61d restricting the movement. Since above description is similarly applied to the cable extension part 62, its description will be omitted.

The inner cable 91 connected by the slider 2 and the outer casing 92 locked in the fixing parts 61a and 62a are led out from the cable extension parts 61 and 62 to outside of the slider housing member 3. Closing the lid member 31 to bring the slider housing member 3 into a closed state brings the cables 9 from the temporary-fixed state into a fully-fixed state where the fixing parts 61 and 62 cover the substantially entire circumference of the fixing parts 61 and 62 of the cable 9.

<Usage Example>

Next, with reference to FIG. 3, a usage example of the cable connecting mechanism 1 will be described. In the present embodiment, the cable connecting mechanism 1 connects the plurality of cables 9 to each other, and thus, an operating force applied to the operation parts Ma and Mb is transmitted to the two operated parts Na and Nb of the operated object 8, through the cable 9. The operated object 8 is, for example, a seat of a vehicle. The operated parts Na and Nb are, for example, a lock mechanism to lock an angle of a backrest of the seat, or a lock mechanism to fix a position of a seat surface of the seat. In any of the lock mechanisms, the lock mechanism is released by operating the lock mechanism with the operation part M, and thus, enables adjustment of the angle of the backrest or the position of the seat surface. In the present embodiment, as described above, connecting between from the operation parts Ma and Mb to the respective operated parts 81 and 82 with the inner cable 91 and the slider 2 makes it possible to transmit the operating force applied to one of the operation parts Ma and Mb to both of the operated parts 81 and 82. That is, even operating only one of the operation parts Ma and Mb enables operation of both of the operated parts Na and Nb.

In the present embodiment, the operated parts 81 and 82 have a publicly known biasing force applying mechanism (not shown) configured to give an biasing force R so as to pull inner cables 91Na and 91Nb in. Therefore, the slider 2 is positioned on the x2 side, which is another end side inside the cable connecting mechanism 1, when the operation parts M and Ma are in a non-operation state.

When the operation part Ma or the operation part Mb is operated and generates an operating force F larger than the biasing force R, an inner cable 91Ma or an inner cable 91Mb moves to the x1 side. As a result, the slider 2 connected with the inner cables 91Ma and 91Mb slides to the x1 side inside the cable connecting mechanism 1. In addition, as the inner cables 91Na and 91Nb connected to the slider 2 move toward the x1 side, the operating force F is transmitted to the operated parts 81 and 82. When the operating force F decreases, the urging force R causes the inner cables 91Na and 91Nb, the slider 2, and the inner cables 91Ma and 91Mb to move toward the x2 side, and the slider 2 returns to the original x2 side.

Here, for example, there is a case where the operated object 8 assembled with the cables 9Na and 9Nb is arranged with respect to the operation parts Ma and Mb assembled with the cables 9Ma and 9Mb, and then the cables 9Ma and 9Mb on the operation part M side are connected to the cables 9Na and 9Nb on an operated member side, by the cable connecting mechanism 1. In addition, there is a case where the cable 9 is routed at a predetermined installation place, and the cables 9Ma and 9Mb and the cables 9Na and 9Nb are connected by the cable connecting mechanism 1. In this case, a place where the cable connecting mechanism 1 is disposed may be a place where a load for deforming the slider housing member 3 is applied. A specific example includes a place where the cable 9 led out from the cable connecting mechanism 1 is curved in the immediate vicinity of the cable extension parts 61 and 62 of the slider housing member 3. In such a place, since the cable 9 is curved, the cable 9 gives some forces to the lid member 31 and the bottom surface member 32, and thus the lid member 31 and the bottom surface member 32 are to relatively move. That is, there may be a case where a load for pressing at least one of the lid member 31 and the bottom surface member 32 from the cable 9 is applied to the slider housing member 3, and the direction applied with this load may be a direction to release the closed state. As will be described in detail later, the cable connecting mechanism 1 of the present embodiment prevents the lid member 31 and the bottom surface member 32 from moving relative to each other, by having the wall portions 11 and 12. Thereby, preventing breakage of the hinge 4 and maintaining the slider housing member 3 in a closed state.

<Details of Wall Portion and Engagement Structure>

Hereinafter, with reference to FIGS. 4 to 7, the structure which maintains the slider housing member 3 in a closed state will be described in detail. Since the hinges 41, 42, and 43 are members that enable the slider housing member 3 to be opened and closed, the strength of the hinges 41, 42, and 43 is weaker than that of the engagement structure 5. Therefore, in the present embodiment, in order to reduce a load applied on such a weak hinge 4, the cable connecting mechanism 1 includes the wall portion 11 and 12, the first engagement structure 51, and the second engagement structure 52, on the shaft side V of the slider housing member 3.

As shown in FIG. 5, the lid member 31 houses the slider 2 connected with the cable 9. For forming the sliding space asp by closing the opening of the bottom surface member 32 with the lid member 31, the lid member 31 is rotated around the hinge 4 as a central axis. At this time, in order not to prevent the rotation when the wall portions 11 and 12 abut on an end surface of an opening of the bottom surface member 32, there is provided the chamfered portion 10 which is formed by chamfering an outer surface side of the end part of the opening, on the outer surface of the side wall 32*a*. Thereafter, by engaging each of the engagement structures 5, the slider housing member 3 is brought into a closed state. The wall portions 11 and 12 are provided such that an inner surface Wa is come close to or in contact with an outer surface Wb of the side wall 32*a* in the closed state. Therefore, when the lid member 31 and the bottom surface member 32 are to move relative to each other by the cable 9 giving some forces to the lid member 31 or the bottom surface member 32, the wall portion 11 serves as a stopper to restrict the movement by abutting on the outer surface Wb of the side wall 32*a*. This can suppress a relative movement between the lid member 31 and the bottom surface member 32, and can accordingly reduce the load applied to the hinge 4. Therefore, the closed state of the slider housing member 3 can be prevented from being released due to breakage of the hinge 4.

In the present embodiment, the engagement parts 53*a*, 54*a*, and 55*a* of the engagement parts 53*a*, 54*a*, and 55*a* of the third to fifth engagement structures are engaged with the engaged parts 53*b*, 54*b*, and 55*b*, while abutting on the outer periphery in the y direction of the bottom surface member 32, or facing the outer periphery in the y direction at a close distance. Therefore, in the closed state of the slider housing member 3, the engagement parts 53*a*, 54*a*, and 55*a* restrict a relative movement of the lid member 31 and the bottom surface member 32 in the y direction, and the hinge 4 is protected. Thus, it is possible to provide the cable connecting mechanism 1 which the hinge 4 is not easily damaged.

It should be noted that the wall portions 11 and 12 are not limited to the configuration in which two wall portions 11 and 12 are provided on the lid member 31, and any number of wall portions 11 and 12 can be provided in either one or both of the lid member 31 and the bottom surface member 32.

Figure 6:
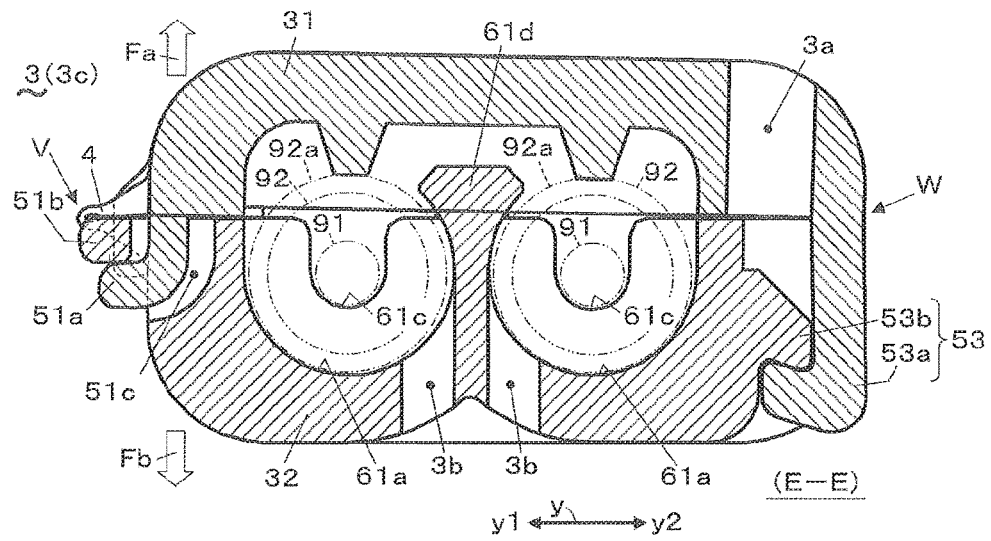
FIG. 6 is a cross-sectional view of the slider housing member of FIG. 4(e) in a closed state.

With reference to FIG. 6, the first engagement structure 51 of FIG. 4(e) will be described. The description of the first engagement structure 51 is similarly applied to the second engagement structure 52. When the slider housing member 3 is in a closed state, inserting the engaging claw 51a into an engaging hole 51c of the engaging frame 51b causes the engaging claw 51a to be engaged with the engaging frame 51b. The leading end side of the engaging claw 51a gets under a lower portion of the engaging frame 51b. The engagement of the engaging claw 51a and the engaging frame 51b is formed by relatively rotating the engaging claw 51a 180 degrees with respect to the engaging frame 51b. More specifically, a shape of the engaging claw 51a is L-shaped in cross section along a direction orthogonal to the sliding direction of the slider 2, and has a claw portion at its leading end. Then, the claw portion is rotated to the lower portion of the engaging frame 51b and is engaged with the engaging frame 51b.

The first engagement structure 51 is not disengaged by a relative parallel movement that separates the lid member 31 and the bottom surface member 32 from each other. For example, as shown in FIG. 6, since the leading end of the engagement part 51a faces the engaging frame 51b, the engagement state is not released by the movement including a component in the vertical direction.

Here, for example, it is assumed a case where the inner cable 91 or the outer casing 92 causes an upward external force Fa acting on the lid member 31, and a downward external force Fb acting on the bottom surface member 32. Such external forces Fa and Fb serve as forces for vertically separating the lid member 31 and the bottom surface member 32 from each other. When the lid member 31 and the bottom surface member 32 receive this force for separating them vertically, the hinge 4 may be damaged and the closed state may not be maintained in some cases. However, since the engaging claw 51a gets under the lower portion of the engaging frame 51b, the upward movement of the lid member 31 is restricted. Therefore, the vertically opening force is not transmitted to the hinge 4, and fatigue deterioration and breakage of the hinge 4 are prevented.

Further, since the first engagement structure 51 is on the same shaft side V as the hinge 4 and prevents separation of the lid member 31 and the bottom surface member 32, it is possible to restrict the opening operation of the slider housing member 3 with the rotation center on the opening and closing side W on the opposite side in the y direction. Therefore, even when the hinge 4 is broken, the first engagement structure 51 prevents the slider 2 from projecting by being released the closed state of the slider housing member 3 simultaneously with breakage of the hinge 4.

The configuration of the first engagement structure 51 is not limited to the configuration in which the engaging claw 51a is provided on the lid member 31 and the engaging frame 51b is provided on the bottom surface member 32. Further, in order to facilitate engagement of the engaging claw 51a and the engaging frame 51b by rotation, the configuration may be such that a parallel movement operation based on the flexibility of the hinge 4 is added to the relative rotating operation between the lid member 31 and the bottom surface member 32.

In the present embodiment, the first engagement structure 51 is provided in the cable extension part 61. By providing the first engagement structure 51 in the cable extension part, the engaging frame 51b having the engaging hole 51c and an outer shape of the slider housing member 3 in the y direction can be formed compactly. It should be noted that the through holes 3a, 3b, and the like are structures formed by arranging a mold of an overhanging shape part when resin-molding the slider housing member 3, and such an arrangement configuration of the mold can provide a lightweight and compact slider housing member 3.

In the slider housing member 3 of the present embodiment, the cable 9 extends to the operation side and the operated side. The cable connecting mechanism 1 of the present embodiment can be used for a control cable assembly that is for performing opening operation or the like of a seat cable or a hood of a vehicle from the seated position of a driver. Therefore, the operation-side cable 9M and the operated-side cable 9N extending from the slider housing member 3 are not planar in the routing state, but arranged in a non-planar routing state. The non-planar routing state includes a direction component perpendicular to the extending direction of the cable 9 from the slider housing member 3, such as a vertical direction of the drawing in FIG. 1 and a front and back direction of the page. Therefore, at the end part of the slider housing member 3 where the cable 9 extends, the slider housing member 3 receives a force including a direction component which is perpendicular to the extending direction of the cable 9, from the operation-side cable 9M and the operated-side cable 9N arranged in the non-planar routing state.

Here, in the slider housing member 3, the hinge 4 is provided on one of the outer surfaces of the slider housing member 3 in a direction perpendicular to the extending direction of the cable 9 from the slider housing member 3. On another side of the outer surface of the slider housing member 3, which is on the opposite side to the hinge 4, there are provided engagement structures 53, 54, and 55 capable of engagement and disengagement. In engagement structures 53, 54, and 55, in order to enable the lid member 31 and the bottom surface member 31 to open and close the slider housing member 3 by a pivotal movement about the hinge 4 as an axis, there is provided a hooking part protruding in a direction perpendicular to an extending direction of a main body, at the leading end of the engaging claw extending from the lid member 31. Further, the engagement structures 53, 54, and 55 are configured such that engagement and disengagement can be performed by elastic deformation or movement, of the engaging claws 53a, 54a, and 55a, in a direction including a direction component perpendicular to the extending direction of the cable 9.

Accordingly, a direction of a force caused by vibration and movement which the cable 9 applies to the slider housing member 3 by the non-planar routing state of the operation-side cable 9M and the operated-side cable 9N, and a movement direction for disengaging the engaging claws 53a, 54a, and 55a for enabling opening and closing of the lid member 31 and the bottom surface member 31, both include a component which is perpendicular to the extending direction of the cable 9 from the slider housing member 3. Therefore, there is concern that the engaging claws 53a, 54a, 55a, and the engaged parts 54b, 54b, 55b may be disengaged by vibration and movement of the cable 9. Further, the engagement structures 51 and 52 which is provided on the side provided with the hinge 4 on the outer surface of the slider housing member 3 are also configured such that a pivotal movement of the lid member 31 with respect to the bottom surface member 32 causes the engagement part to be inserted into the engaging hole and engaged with the engaging frame. Therefore, the leading ends of the engagement parts 51a and 52a protrude in a direction perpendicular to an extending direction of the engagement part main body with respect to the engagement part main body which extends from the lid member 31. This causes concern that the engagement structure may disengaged by the movement of the lid member 31 in the same direction as that for disengaging the engagement structure which is provided on the outer surface of the slider housing member 3 on the side opposite to the hinge 4.

However, the cable connecting mechanism 1 of the present invention has the wall portion on the outer surface of the slider housing member 3 on the same side as the hinge, in which the lid member 31 relatively moves in a direction different from the extending direction of the cable 9. Since this wall portion has no or little space between the bottom surface member 32 and the wall portions 11 and 12, the wall portions 11 and 12 and the hinge 9 cause the wall portion to receive a force of a direction component perpendicular to the extending direction of the cable 9, avoiding disengagement of the engaging mechanism and preventing the slider housing member 3 from being opened. In particular, when the lid member 31 and the bottom surface member 31 of the slider housing member 3 including the hinge 4 are molded integrally from a synthetic resin, the bent portion of the hinge 4 is thin and the hinge 4 can be easily broken if the lid member 31 and the bottom surface member 31 move in the horizontal direction. However, since the wall portions 11 and 12 restrict the movement of the lid member 31 in the direction permitted by the elastic deformation of the engaging claw, no excessive force is applied to the hinge 4, and the hinge 4 will not be broken, for example, even at a high temperature of 40° C. or more.

Figure 7:
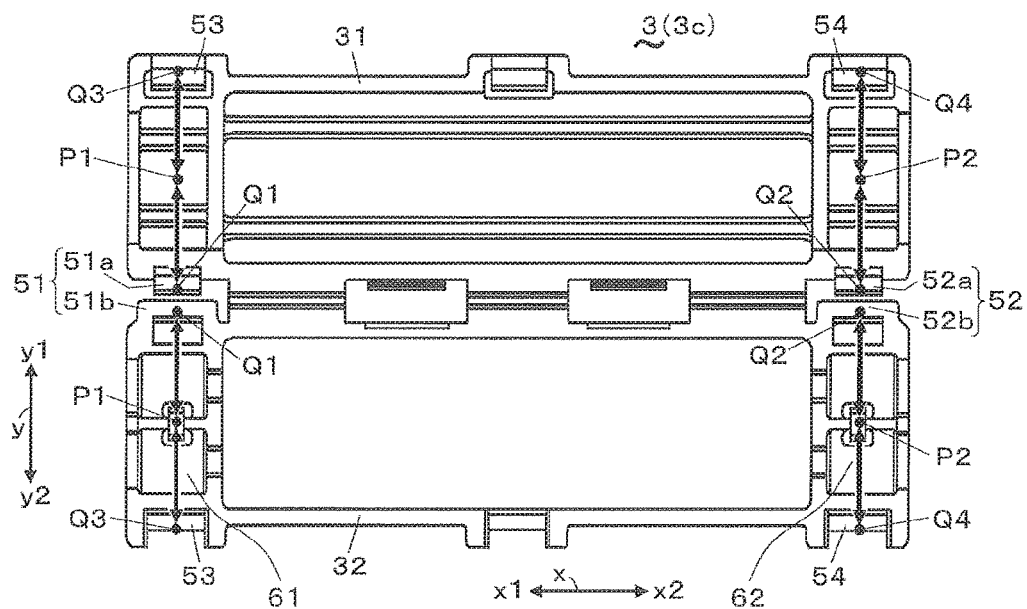
FIG. 7 is a plan view for illustrating a positional relationship of engagement structures in a slider housing member of a cable connecting mechanism according to an embodiment.

Next, with reference to FIG. 7, a relationship between the cable extension parts 61, 62 and the engagement structure 5 will be described. In the cable connecting mechanism 1, it is preferable that the first engagement structure 51, the second engagement structure 52, the third engagement structure 53 and the fourth engagement structure 54 are arranged at positions where a distance from the cable extension part 61 on the one end x1 side to the first engagement structure 51 is substantially equal to a distance from the cable extension part 61 on the one end x1 side to the third engagement structure 53, and a distance from the cable extension part 62 on the another end x2 side to the second engagement structure 52 is substantially equal to a distance from the cable extension part 62 on the another end x2 side to the fourth engagement structure 54. In the present embodiment, a distance from the position of the cable extension part 61 of one end side indicated by point P1 to the position of the first engagement structure 51 indicated by point Q1 is substantially equal to a distance from the position of the cable extension part 61 of one end side indicated by point P1 to the position of the third engagement structure 53 indicated by point Q3. Point P1 is a point at a center position of the cable extension part 61 and points Q1 and Q3 are points at center positions of the first engagement structure 51 and the third engagement structure 53, respectively. Similarly, a distance from the position of the cable extension part 62 of another end side indicated by point P2 to the position of the second engagement structure 52 indicated by point Q2 is substantially equal to a distance from the position of the cable extension part 62 of another end side indicated by point P2 to the position of the fourth engagement structure 54 indicated by point Q4. According to the arrangement structure of the cable extension parts 61 and 62 and the engagement structure 5, the plurality of engagement structures 5 can share the load applied to the cable extension parts 61, 62 from the cable 9. Therefore, concentrating the load on the specific engagement structure 5 makes it possible to avoid disengagement of the engagement structure 5 where the load concentrates.

It should be noted that the present invention is not limited to the above configuration, but various modifications are possible. For example, the above-described configurations each may be combined with each other. The cable connecting mechanism 1 can be configured to connect any plurality of cables 9, and can be used with a reduced number of cables 9 to be connected when the cable connecting mechanism 1 is used. The cable end 91a of the end of the inner cable 91 is not particularly limited as long as it has a strength capable of locking the inner cable 91 with the slider 2 and transmitting the operating force, and any shape such as a columnar shape or prismatic shape can be used in addition to a spherical shape. Further, the configuration may be such that at least one of the engagement structures 5 has an engagement part provided on the one of the lid member 31 and the bottom surface member 32, and an engaged part provided on the other.

REFERENCE SIGNS LIST 1 cable connecting mechanism
11 wall portion
12 wall portion
2 slider
21 cable connecting part
21a cable lead-out groove
21b locking recess
3 slider housing member
31 lid member
3sp sliding space
3c case member
32 bottom surface member
32a one side wall
32b other side wall
32s sliding surface
4 hinge
41 one-end-side hinge
42 another-end-side hinge
43 center hinge
5 engagement structure
51 first engagement structure
52 second engagement structure
53 third engagement structure
54 fourth engagement structure
55 fifth engagement structure
61 cable extension part of one end side
61a fixing part (outer casing fixing part of one end side)
62 cable extension part of another end side
62a fixing part (outer casing fixing part of another end side)
8 operated object
9 cable
9M, 9Ma, 9Mb operation-side cable
9N, 9Na, 9Nb operated-side cable
91 inner cable
92 outer casing
M, Ma, Mb operation part
N, Na, Nb operated part
Wa inner surface
Wb outer surface
y alignment direction of a pair of side walls
y1 one side
y2 another side
x sliding direction
x1 one end side
x2 another end side

The invention claimed is:

1. A cable connecting mechanism comprising;
a slider, and
a slider housing member that houses the slider and has a space allowing the slider to slide; wherein
the slider has a cable connecting part connected with a cable at both end parts in a sliding direction of the slider,
the slider housing member comprises
a lid member,
a bottom surface member provided with a sliding surface on which the slider slides,
a pair of side walls rising from the sliding surface and extending along the sliding direction of the slider,
a one-end-side hinge which is provided on an outer surface on one end side of one of the pair of side walls and which connects the lid member and the bottom surface member,
an another-end-side hinge which is provided on an outer surface on another end side of one of the pair of side walls and which connects the lid member and the bottom surface member,
a first engagement structure that is provided on an outer surface closer to one end of the slider housing member than the one-end-side hinge and maintains the slider housing member in a closed state,
a second engagement structure that is provided on an outer surface closer to another end of the slider housing member than the another-end-side hinge and maintains the slider housing member in a closed state,
a third engagement structure that is provided on an outer surface on one end side of another one of the pair of side walls and maintains the slider housing member in a closed state,
a fourth engagement structure that is provided on an outer surface on another end side of another one of the pair of side walls and maintains the slider housing member in a closed state,
a cable extension part provided at both end parts and allowing the cable to extend outside, and
a wall portion arranged on an outer surface of the slider housing member to be sandwiched between the one-end-side hinge and the another-end-side hinge; and
in the closed state, when a load is applied to the cable to release the closed state by pressing at least one of the lid member and the bottom surface member, the wall portion abuts on an outer circumference of another one of the lid member and the bottom surface member, and thus restricts a movement of the lid member or the bottom surface member in an alignment direction of the pair of side walls.

2. The cable connecting mechanism according to claim 1, wherein the first engagement structure, the second engagement structure, the third engagement structure, and the fourth engagement structure are arranged at positions in which a distance from the cable extension part of one end side to the first engagement structure is substantially equal to a distance from the cable extension part of one end side to the third engagement structure, and a distance from the cable extension part of another end side to the second engagement structure is substantially equal to a distance from the cable extension part of another end side to the fourth engagement structure.

3. The cable connecting mechanism according to claim 1, further comprising a fifth engagement structure between the third engagement structure and the fourth engagement structure, the fifth engagement structure being configured to maintain the slider housing member in a closed state.

4. The cable connecting mechanism according to claim 1; wherein
the cable includes an inner cable and an outer casing through which the inner cable is inserted;
the cable extension part of one end side has an outer casing fixing part of one end side, to which one end of the outer casing is fixed, and the cable extension part of another end side has an outer casing fixing part of another end side, to which one end of the outer casing is fixed;
the outer casing fixing part of one end side, the first engagement structure, and the third engagement structure are aligned in parallel in the alignment direction of the pair of side walls; and
the outer casing fixing part of another end side, the second engagement structure, and the fourth engagement structure are aligned in parallel in the alignment direction of the pair of side walls.

5. The cable connecting mechanism according to claim 1, wherein at least one of the engagement structures comprises an engagement part provided on one of the lid member and the bottom surface member and an engaged part that is provided on another one of the lid member and the bottom surface member.

* * * * *